(12) United States Patent
Izumi et al.

(10) Patent No.: US 8,358,681 B2
(45) Date of Patent: Jan. 22, 2013

(54) COMMUNICATION APPARATUS AND COMMUNICATION CALIBRATION METHOD

(75) Inventors: Seiichi Izumi, Kanagawa (JP); Hiroaki Takahashi, Kanagawa (JP); Hiroaki Takano, Saitama (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 736 days.

(21) Appl. No.: 12/483,363

(22) Filed: Jun. 12, 2009

(65) Prior Publication Data

US 2010/0008407 A1 Jan. 14, 2010

(30) Foreign Application Priority Data

Jul. 10, 2008 (JP) .................................. 2008-180247

(51) Int. Cl.
*H04B 1/38* (2006.01)
*H04L 5/16* (2006.01)

(52) U.S. Cl. .......................................... 375/219; 455/73

(58) Field of Classification Search .................... 375/219
See application file for complete search history.

(56) References Cited

U.S. PATENT DOCUMENTS

| | | | | |
|---|---|---|---|---|
| 8,068,850 | B1* | 11/2011 | Kleinfelder et al. | 455/456.1 |
| 2004/0142729 | A1* | 7/2004 | Yuda et al. | 455/562.1 |
| 2006/0007040 | A1* | 1/2006 | Kawasaki | 342/368 |
| 2006/0009180 | A1* | 1/2006 | Xu et al. | 455/226.1 |
| 2006/0135211 | A1* | 6/2006 | Chae et al. | 455/562.1 |
| 2006/0279459 | A1* | 12/2006 | Akiyama et al. | 342/372 |
| 2007/0183531 | A1* | 8/2007 | Ahmed et al. | 375/297 |
| 2008/0310529 | A1* | 12/2008 | Futatsugi | 375/260 |
| 2010/0283682 | A1* | 11/2010 | Heidari-Bateni et al. | 342/387 |

FOREIGN PATENT DOCUMENTS

| | | |
|---|---|---|
| JP | 11-46180 | 2/1999 |
| JP | 2002-64463 A | 2/2002 |
| JP | 2002-176440 A | 6/2002 |
| JP | 2006-19991 | 1/2006 |
| JP | 2006-270376 A | 10/2006 |
| JP | 2007-116489 | 5/2007 |

OTHER PUBLICATIONS

Japanese Office Action issued Jan. 25, 2011, in Patent Application No. 2008-180247.

* cited by examiner

*Primary Examiner* — Erin File
(74) *Attorney, Agent, or Firm* — Oblon, Spivak, McClelland, Maier & Neustadt, L.L.P.

(57) ABSTRACT

There is provided a communication apparatus, including a transmission unit that transmits information by a plurality of systems and a reception unit that receives information by a plurality of systems, wherein the transmission unit includes a calibration information generation unit that generates calibration information transmitted for each the system and a calibration information generation notification generation unit that generates a calibration information generation notification indicating that the calibration information has been generated by the calibration information generation unit for each system, and the reception unit includes a calibration information detection unit that starts measurement of time based on reception of the calibration information generation notification and detecting calibration information turned back by the transmission unit for each system after a fixed time passes after starting measurement of time.

9 Claims, 6 Drawing Sheets

COMMUNICATION APPARATUS AND COMMUNICATION CALIBRATION METHOD

BACKGROUND OF THE INVENTION

1. Field of the Invention

The present invention relates to a communication apparatus and a communication calibration method, and in particular, relates to a communication apparatus and a communication calibration method that perform a calibration for compensating for characteristic differences among elements of a plurality of antennas in the communication apparatus having the plurality of antennas.

2. Description of the Related Art

A wireless network has gained attention as a system that allows people free from wiring in a cable communication system in related art. IEEE (The Institute of Electrical and Electronics Engineers) 802.11 can be cited as a standard for a wireless network.

In IEEE 802.11a/g, for example, the OFDM (Orthogonal Frequency Division Multiplexing) modulation method, which is a kind of multicarrier method, is adopted as a standard for wireless LAN. According to the OFDM modulation method, transmission data is transmitted by being distributed to a plurality of carriers to which frequencies orthogonal to each other are set in the OFDM modulation method and the band of each carrier becomes narrow, resulting in characteristics of very high utilization efficiency of frequency and being resistant to frequency selective fading disturbances.

While the standard of IEEE 802.11a supports a modulation method reaching a communication speed of up to 54 Mbps, a wireless communication standard capable of realizing a still higher bit rate has been sought after. A multi-antenna technology in which a communication instrument has a plurality of antennas can be cited as a wireless communication technology to realize wireless data transmission of high throughput.

An adaptive array antenna in which a plurality of antennas are arranged in an array form so that directivity can be dynamically changed adjusting to radio environment changes is widely known as an example of multi-antenna technology. The adaptive array antenna supports communication by controlling the gain of each antenna element to obtain appropriate antenna directivity in transmission/reception. That is, signals received by each antenna element constituting the adaptive array antenna are synthesized after each signal being weighted by multiplication of an appropriate weighting factor to control a receiving directivity pattern as a whole array antenna. Moreover, a transmitting directivity pattern as a whole array antenna is controlled by multiplying each transmission signal by an appropriate weighting factor for each antenna element before being transmitted from each antenna element.

As another example of wireless communication technology using a multi-antenna, MIMO (Multi-Input Multi-Output) communication has received attention. This is a communication method in which a plurality of antenna elements is provided both on the transmitter side and receiver side to realize a plurality of spatially multiplexed MIMO channels. On the transmitter side, transmission data is transmitted by being distributed to a plurality of streams using the plurality of antennas, and the receiver can extract a signal of each stream without cross talk by performing signal processing on spatial signals received by the plurality of antennas. In IEEE 802.11a/n, for example, the MIMO-OFDM method using OFDM for primary modulation is adopted. According to the MIMO communication method, improvement of the communication speed can be achieved by expanding transmission capacity in accordance with the number of antennas without increasing the frequency band.

The SVD-MIMO method using singular value decomposition (SVD) of a channel function H is known as a typical example of the MIMO communication method. In SVD-MIMO transmission, $UDV^H$ is determined by performing singular value decomposition of a numeric matrix having channel information corresponding to each antenna pair as an element, that is, a channel information matrix H to provide a matrix V as an antenna weighting factor matrix on the transmission side and $(UD)^H$ as an antenna weighting factor matrix on the reception side (U and V are unitary matrices and D is a diagonal matrix). Accordingly, each MIMO channel is represented as a diagonal matrix D having a square root of each singular value ($\lambda_i$) as an element. That is, a plurality of transmission paths that are spatially orthogonal and multiplexed and theoretically independent is realized, and a sequence of a plurality of original signals can be extracted on the receiver side without cross talk at all so that the highest performance is theoretically achieved.

In an adaptive array antenna, however, a directivity pattern on the transmission system and that on the reception system do not match due to fluctuations in characteristics of each element constituting the transmission/reception system and line length (hereinafter, referred to also as "irreversibility"). Therefore, even if weighting factors calculated for reception are used during transmission unchanged, a receiving directivity pattern and a transmitting directivity pattern will not match.

To compensate for such irreversibility of directivity patterns, correction value calculation processing called a calibration is performed in the adaptive array antenna in advance and a receiving directivity pattern and a transmitting directivity pattern are made to match by correcting the weighting factors using correction values obtained during the calibration. The calibration method is roughly divided into a calibration inside apparatus (self calibration) and that outside apparatus.

The calibration outside apparatus uses, in addition to a communication apparatus having an adaptive array antenna (referred to as an apparatus A), a communication apparatus for calibration (referred to as an apparatus B). After receiving a reference signal transmitted from each antenna element of the adaptive array antenna included in the apparatus A, the apparatus B returns the received reference signal to the apparatus A as feedback. Then, the apparatus A having the adaptive array antenna detects fluctuations in characteristics of each transmission/reception system including antennas and propagation path by comparing the reference signal turned back from the apparatus B and the original reference signal to correct fluctuations.

The calibration inside apparatus, on the other hand, causes a reception system to turn back a reference signal generated by each transmission system of the communication apparatus, compares the reference signal turned back by the reception system and the original reference signal, and detects fluctuations in characteristics of each transmission/reception system including antennas and propagation path to correct fluctuations.

In the calibration outside apparatus, it is difficult to transmit data during feedback of a reference signal from the apparatus B to the apparatus A and thus, throughput during communication from the apparatus B to the apparatus A is degraded. If feedback from the apparatus B to the apparatus A takes time, the propagation environment may change in the meantime. That is, there is an issue that the calibration outside apparatus is subject to a surrounding environment and the signal-to-noise ratio (SN ratio).

The calibration inside apparatus, on the other hand, is resistant to a surrounding environment and the signal-to-noise ratio (SN ratio) when compared with the calibration outside apparatus because the calibration is completed within an apparatus. A technology to perform a calibration using the calibration inside apparatus is disclosed, for example, in Japanese Patent Application Laid-Open No. 2007-116489.

SUMMARY OF THE INVENTION

In a calibration inside apparatus in transmission and reception circuits of each branch for transmission beam forming, it is necessary to synchronize the transmission and reception circuits in the same timing for each of several calibration measurements for channel estimation. In the OFDM method, synchronization is necessary only within the range of guard interval (GI) section and there is a possibility of being out of synchronization by about one or two samples even after being synchronized by adding a preamble to information for calibration (sequence for calibration). If synchronization is lost, the channel to be estimated will be different and thus, there is an issue that it is difficult to calibrate loop-back from a transmission system to a reception system.

If, on the other hand, a dedicated circuit in which a transmission system and a reception system are integrated to calibrate loop-back from the transmission system to the reception system is provided, there is an issue that the circuit size of an apparatus grows. Moreover, when loop-back between antennas is calibrated in an apparatus including such a circuit, it is necessary to rearrange the antenna branch and thus, there is an issue that it is difficult to support such rearrangement by calibration of a branch whose transmission system and reception system are the same.

The present invention has been made in view of the above issues, and it is desirable to provide a novel and improved communication apparatus capable of performing a calibration inside apparatus with precision by adjusting detection timing of calibration signals and a communication calibration method.

According to an embodiment of the present invention, there is provided a communication apparatus, including: a transmission unit that transmits information by a plurality of systems; and a reception unit that receives information by a plurality of systems, wherein the transmission unit includes: a calibration information generation unit that generates calibration information transmitted for each of the systems; and a calibration information generation notification generation unit that generates a calibration information generation notification indicating that the calibration information has been generated by the calibration information generation unit for each system, and the reception unit includes: a calibration information detection unit that starts measurement of time based on reception of the calibration information generation notification and detecting calibration information turned back by the transmission device for each system after a fixed time passes after starting measurement of time.

According to the above configuration, the transmission unit transmits information by a plurality of systems, and the reception unit receives information by a plurality of systems. Then, in the transmission unit, the calibration information generation unit generates calibration information transmitted for each of the system and the calibration information generation notification generation unit generates a calibration information generation notification indicating that the calibration information has been generated by the calibration information generation unit for each system. In the reception unit, on the other hand, the calibration information detection unit starts measurement of time based on reception of the calibration information generation notification and detects calibration information turned back by the transmission unit for each system after a fixed time passes after starting measurement of time. As a result, a calibration inside apparatus can be performed with precision by a calibration information generation notification generated by the transmission unit being received by the reception unit and detection timing of calibration signals being adjusted using the received calibration information generation notification.

The reception unit may further include a synchronization unit that synchronizes information received by the plurality of systems after receiving the calibration information generation notification from the calibration information generation notification generation unit, and the calibration information detection unit may detect calibration information turned back for each system after a fixed time passes after the synchronization unit receives the calibration information generation notification.

The calibration information detection unit may cut out received information in units of OFDM (Orthogonal Frequency Division Multiplexing) symbols after a fixed time passes after receiving the calibration information generation notification.

The calibration information generation unit may change the calibration information for each OFDM symbol.

The communication apparatus may further include an antenna element that transmits and receives information for each system, wherein calibration information is transmitted from one antenna element to another antenna element, and the calibration information detection unit may detect the calibration information received by the other antenna element.

The communication apparatus may further include a calibration information detection time adjusting unit that adjusts a time between a start measurement of time based on reception of the calibration information generation notification that detects calibration information by the calibration information detection unit and the detection start of the calibration information.

According to another embodiment of the present invention, there is provided a communication calibration method, including the steps of: transmitting information by a plurality of systems; and receiving information by a plurality of systems, wherein the transmission step includes the steps of: generating calibration information transmitted for each of the systems; and generating a calibration information generation notification indicating that the calibration information has been generated by the calibration information generation step for each system, and the reception step includes the step of: starting measurement of time based on reception of the calibration information generation notification and detecting calibration information turned back by the transmission unit for each system after a fixed time passes after starting measurement of time.

According to the present invention, as described above, a novel and improved communication apparatus capable of performing a calibration inside apparatus with precision by adjusting detection timing of calibration signals and a communication calibration method can be provided.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 1:
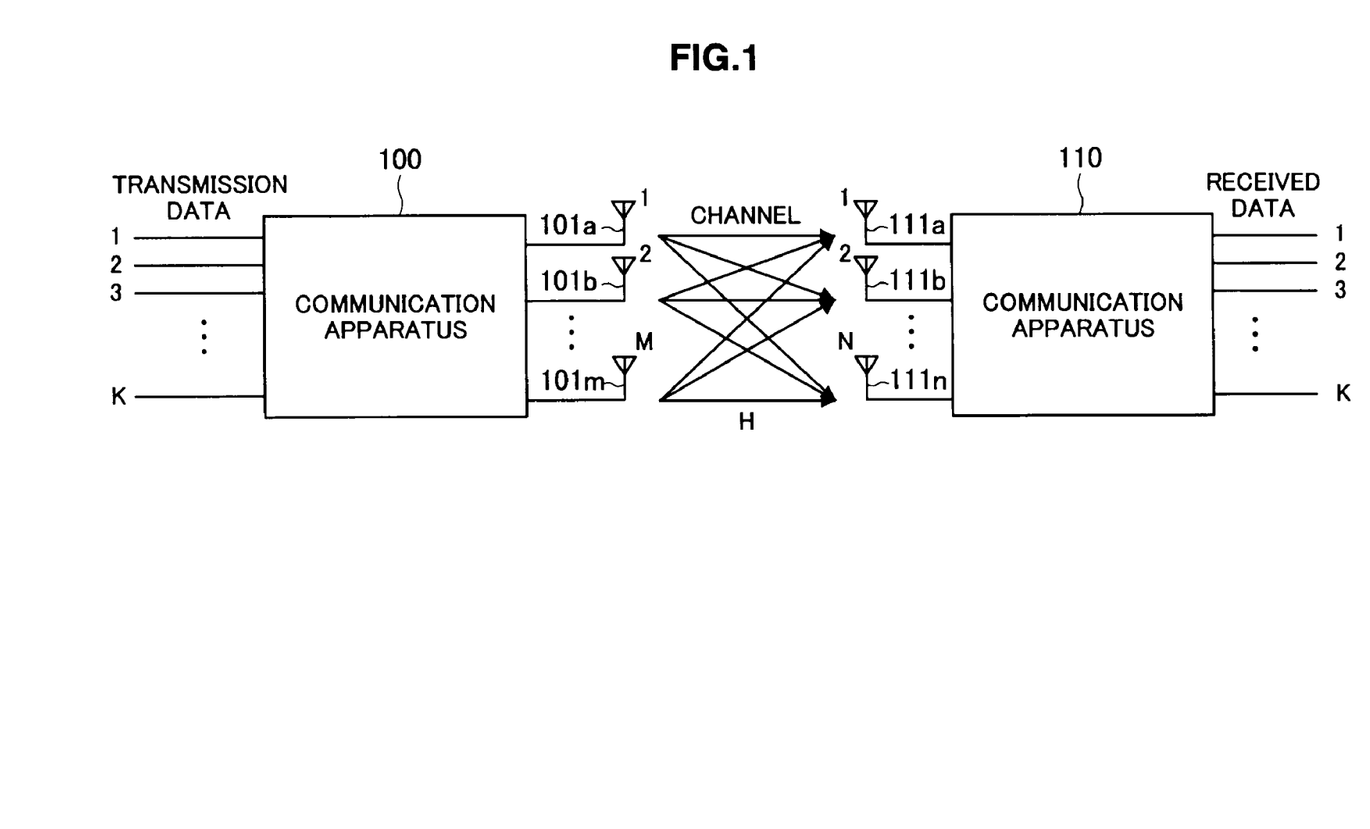
FIG. 1 is an explanatory view illustrating a communication apparatus 100 according to an embodiment of the present invention and a communication system 10 using the communication apparatus 100.

First, an overview of a communication apparatus according to an embodiment of the present invention will be described. FIG. 1 is an explanatory view illustrating the communication apparatus 100 according to an embodiment of the present invention and the communication system 10 using the communication apparatus 100. The communication apparatus 100 according to an embodiment of the present invention and the communication system 10 using the communication apparatus 100 will be described below using FIG. 1.

First, an overview of a wireless communication system according to the MIMO method will be described. FIG. 1 is an explanatory view to conceptually show a wireless communication system according to the MIMO method. In the wireless communication system shown in FIG. 1, the communication apparatus 100 has M antennas 101a, 101b, ..., 101m and a communication apparatus 110 has N antennas 111a, 111b, ..., 111n.

The communication apparatus 100 multiplexes k pieces of transmission data by space/time encoding and distributes the transmission data to the M antennas 101a, 101b, ..., 101m before delivery to channels and the communication apparatus 110 obtains k pieces of received data by space/time decoding received signals received by the N antennas 111a, 111b, ..., 111n via channels.

Therefore, the MIMO method is a communication method utilizing channel characteristics, in which the communication apparatus 100 distributes transmission data to a plurality of antennas for transmission, and the communication apparatus 110 obtains received data by performing signal processing on signals received by a plurality of antennas. Channel information between transmitting/receiving antennas is represented by a channel matrix H of M-row×N-column.

Figure 2A:
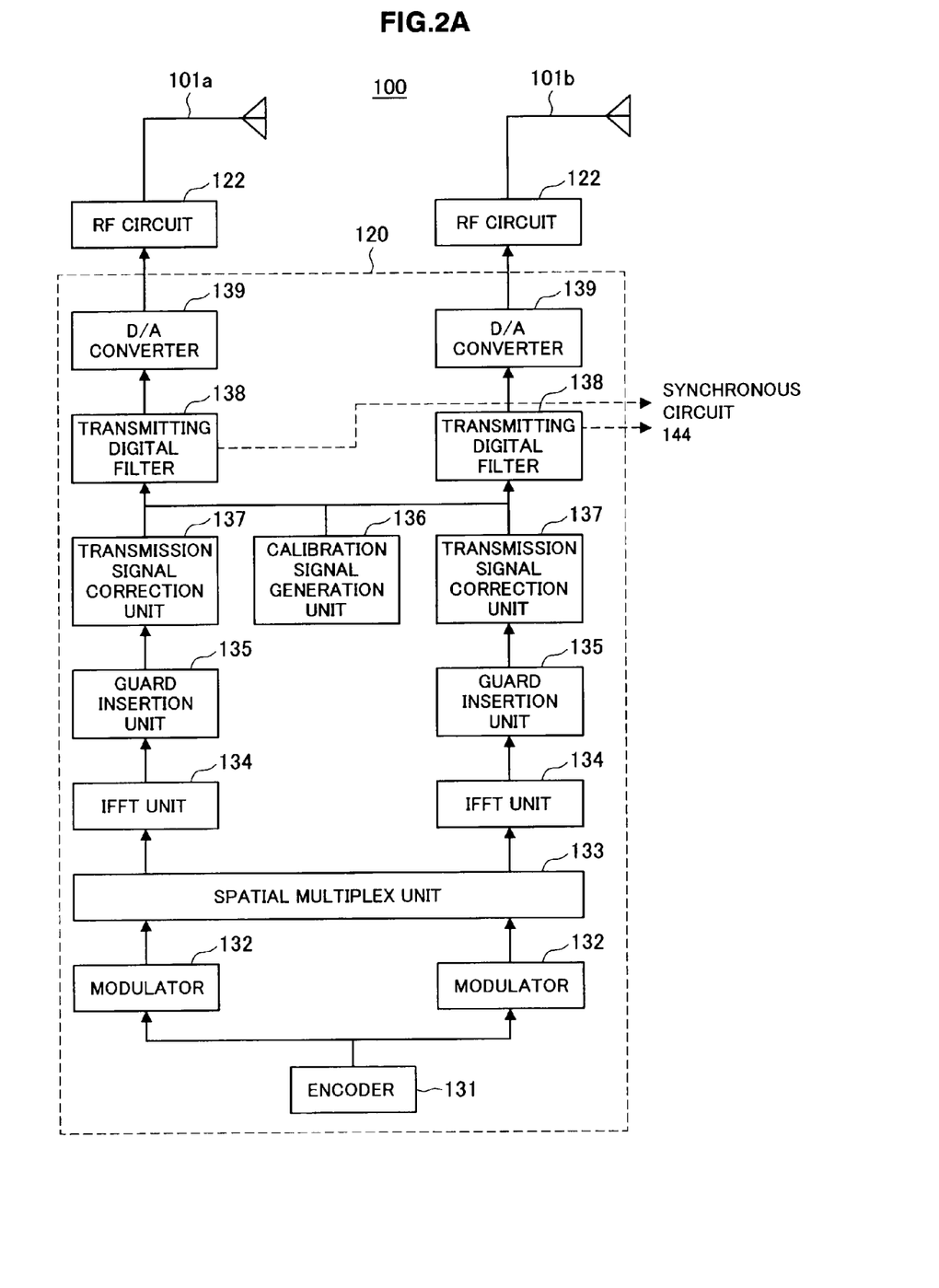
FIG. 2A is an explanatory view illustrating the configuration of the communication apparatus 100 according to an embodiment of the present invention.
Figure 2B:
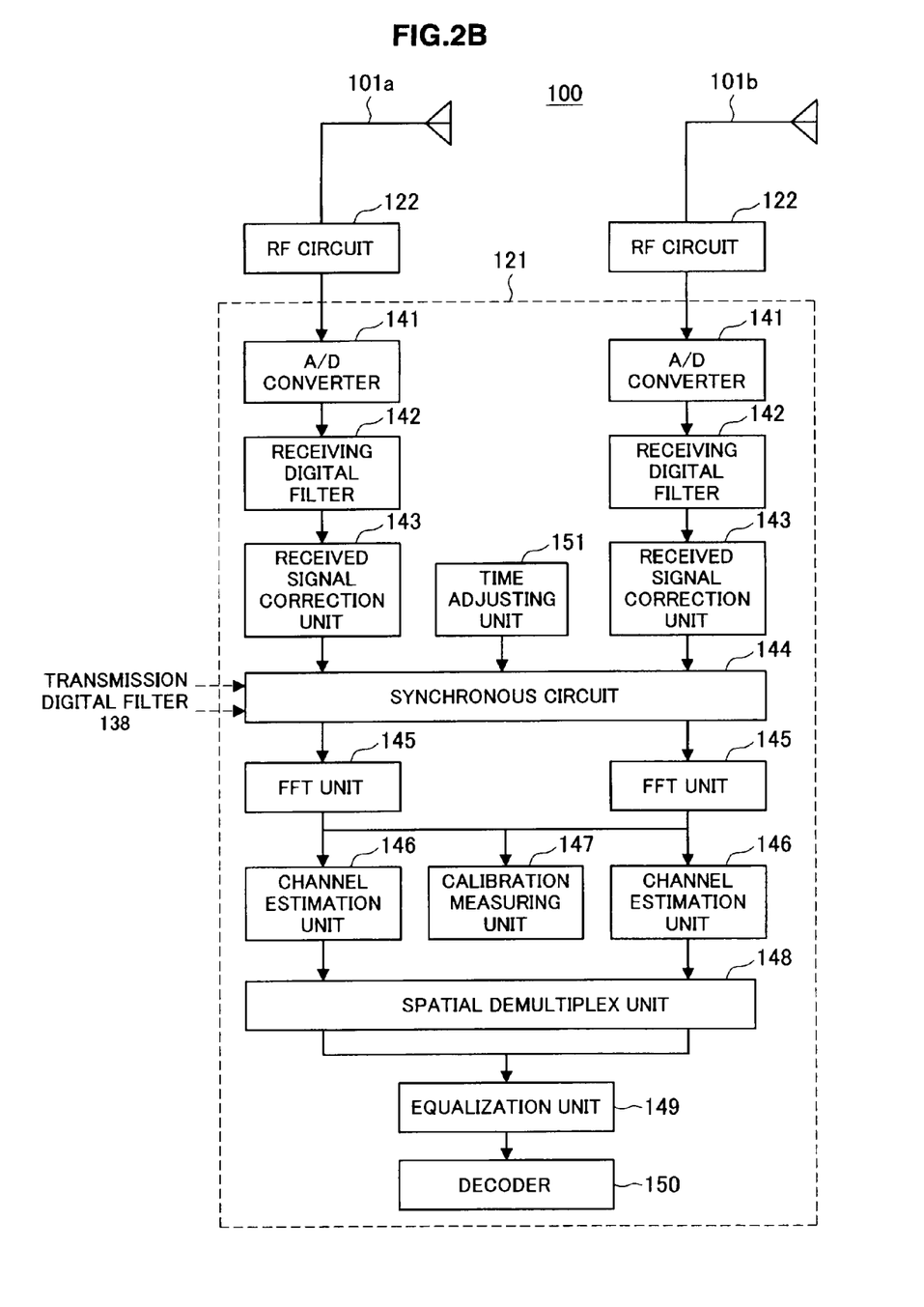
FIG. 2B is an explanatory view illustrating the configuration of the communication apparatus 100 according to an embodiment of the present invention.

In the foregoing, the communication apparatus 100 and the communication system 10 have been described. Next, the configuration of the communication apparatus 100 will be described. FIG. 2A and FIG. 2B are explanatory views illustrating the configuration of the communication apparatus 100 according to an embodiment of the present invention. The configuration of the communication apparatus 100 according to an embodiment of the present invention will be described below using FIG. 2A and FIG. 2B.

In FIG. 2A and FIG. 2B, the configuration of the communication apparatus 100 that has two antennas 101a and 101b and performs transmission processing and reception processing in two systems is exemplified. As shown in FIG. 2A and FIG. 2B, the communication apparatus 100 according to an embodiment of the present invention includes a transmitting circuit 120, a receiving circuit 121, and an RF circuit 122. For the sake of convenience of description, FIG. 2A shows the configuration of the transmitting circuit 120 and FIG. 2B shows the configuration of the receiving circuit 121.

The transmitting circuit 120 is a circuit that generates data to be transmitted from the antennas 101a and 101b. The transmitting circuit 120 includes an encoder 131, a modulator 132, a spatial multiplex unit 133, an inverse fast Fourier transform unit (IFFT unit) 134, a guard insertion unit 135, a calibration signal generation unit 136, a transmission signal correction unit 137, a transmitting digital filter 138, and a D/A converter 139.

The receiving circuit 121 is a circuit that decodes data received by the antennas 101a and 101b. The receiving circuit 121 includes an A/D converter 141, a receiving digital filter 142, a received signal correction unit 143, a synchronous circuit 144, a fast Fourier transform unit (FFT unit) 145, a channel estimation unit 146, a calibration measuring unit 147, a spatial demultiplex unit 148, an equalization unit 149, and a decoder 150.

The encoder 131 is used to perform error correcting coding on transmission data supplied by a data generator (not shown) and scrambled by a scrambler (not shown). The EWC HT PHY specification, for example, is prescribed to follow definitions of IEEE 802.11a concerning scrambling and coding method. Transmission data on which error correcting coding is performed by the encoder 131 is distributed to each stream by a data distribution unit (not shown).

The modulator 132 is used to modulate the transmission data on which error correcting coding has been performed in accordance with a predetermined modulation method such as BPSK (Binary Phase Shift Keying), QPSK (Quadrature Phase Shift Keying), 16 QAM (Quadrature Amplitude Modulation), and 64 QAM to create a transmission signal. As a result of modulation, the transmission signal is mapped into an IQ signal space to become a complex base-band signal. The modulated transmission signal is sent to the spatial multiplex unit 133. The spatial multiplex unit 133 is used to form a beam by calculating a transmission weighting matrix V for beam formation generated from a channel matrix H using the calculation method such as singular value decomposition and multiplying a transmission vector having each transmission stream as an element by the transmission weighting matrix V.

The inverse fast Fourier transform unit 134 is used to transform each sub carrier arranged in a frequency region into a time base signal by an inverse fast Fourier transform. The guard insertion unit 135 adds a guard interval to each subcarrier transformed into a time base signal.

The calibration signal generation unit 136 is used to generate a signal for calibration (calibration sequence). A self calibration of the communication apparatus 100 is performed by a calibration sequence generated by the calibration signal generation unit 136 and turned back from the transmitting circuit 120 to the receiving circuit 121 being detected by the receiving circuit 121.

The transmission signal correction unit 137 is used to correct a transmission signal. In IQ imbalance measurement, whether a signal placed on a sub carrier n has been shifted, as a result of loop-back, to subcarriers such as 2n, −n, and 0 is checked. An optimal correction value is searched for by gradually changing a relative amplitude ratio and phase difference of an IQ signal for each OFDM symbol to detect the optimal correction value. The obtained correction coefficient is used by the transmission signal correction unit 137 to correct a transmission signal.

The transmitting digital filter 138 is a digital filter to limit the band of a transmission signal. The transmission signal that has passed through the transmitting digital filter 138 is sent to the D/A converter 139. Then, in the present embodiment, the transmitting digital filter 138 sends a transmission timing signal of a calibration sequence indicating that a calibration sequence has been sent to the synchronous circuit 144. By sending a transmission timing signal of a calibration sequence from the transmitting digital filter 138 to the synchronous circuit 144, packet head timing is captured to determine the position where an OFDM symbol is cut out.

The D/A converter 139 is used to convert a digital transmission signal that has passed through the transmitting digital filter 138 into an analog transmission signal. A transmission signal converted into an analog signal by the D/A converter 139 is up-converted into an appropriate frequency band by the RF circuit 122 before being sent out to a propagation path from each antenna.

A signal reaching the communication apparatus 100 via the propagation path, on the other hand, is received by each antenna and then, analog processing is performed on the received signal by the RF circuit 122. The received signal on which analog processing has been performed by the RF circuit 122 is sent to the A/D converter 141.

The A/D converter 141 is used to convert a received signal on which analog processing has been performed by the RF circuit 122 into a digital received signal. The received signal converted by the A/D converter 141 is sent to the receiving digital filter 142.

The receiving digital filter 142 is a digital filter that has a digital received signal input thereinto and allows a signal of only a predetermined frequency band to pass. The received signal that has passed through the receiving digital filter 142 is sent to the received signal correction unit 143.

The received signal correction unit 143 is used to correct a received signal. Like transmission signal correction unit 137 described above, the received signal correction unit 143 searches for an optimal correction value by gradually changing a relative amplitude ratio and phase difference of an IQ signal for each OFDM symbol to detect the optimal correction value and corrects a received signal using the obtained correction coefficient. The received signal corrected by the received signal correction unit 143 is sent to the synchronous circuit 144.

The synchronous circuit 144 is used to have received signals corrected by the received signal correction unit 143 input thereinto to synchronize received signals of two systems by performing processing such as packet detection and timing detection. In ordinary communication, the synchronous circuit 144 decides correct timing by detecting a preamble portion and also measures and corrects a frequency offset before cutting out an OFDM signal. A Fourier transform of the cut-out OFDM signal is performed by the subsequent fast Fourier transform unit (FFT unit) 145 for conversion from a time base signal into a frequency base signal.

When the communication apparatus 100 is calibrated, the synchronous circuit 144 plays the role of cutting off a section necessary for the calibration. A Fourier transform of the section cut off by the synchronous circuit 144 is formed by the subsequent fast Fourier transform unit (FFT unit) 145 and an influence of the RF circuit 122 for circuit loop-back and that of the transmitting circuit 120 and the receiving circuit 121 for antenna loop-back are measured by the calibration measuring unit 147.

Further, in the present embodiment, the synchronous circuit 144 is notified of a transmission timing signal of a calibration sequence by the transmitting digital filter 138. By receiving a notification of the transmission timing signal of the calibration sequence from the transmitting digital filter 138, the synchronous circuit 144 can capture packet head timing to determine the position where an OFDM symbol is cut out. Received signals synchronized by the synchronous circuit 144 are sent to the fast Fourier transform unit (FFT unit) 145.

The fast Fourier transform unit (FFT unit) 145 is used to have a received signal input thereinto from the synchronous circuit 144 to convert a time base signal into a frequency base signal. The received signal converted into the frequency base signal by the fast Fourier transform unit 145 is sent to the channel estimation unit 146. If a calibration sequence generated by the calibration signal generation unit 136 is contained in the received signal, the calibration sequence is sent from the fast Fourier transform unit 145 to the calibration measuring unit 147.

The channel estimation unit 146 is used to estimate a channel matrix H using the preamble of a received signal. The channel matrix H estimated by the channel estimation unit 146 is used for conversion of a signal of each branch into a data stream by the spatial demultiplex unit 148.

The calibration measuring unit 147 is used to have a calibration sequence generated by the calibration signal generation unit 136 input thereinto to measure an influence of the RF circuit 122 on a signal. The calibration measuring unit 147 can detect a calibration sequence by the receiving circuit 121 being started measurement of time after a notification of a transmission timing signal is received. Here, the calibration measuring unit 147 may cut out information received by the receiving circuit 121 in units of OFDM symbols when a fixed time passes after starting measurement of time. The calibration measuring unit 147 measures differences of channel characteristics by direction to reflect measurement results in a weighting matrix for transmission beam formation by the spatial multiplex unit 133. By reflecting measurement results by the calibration measuring unit 147 in a weighting matrix, characteristics can be adjusted when channel characteristics measured on the receiving side are reflected on the transmitting side.

The spatial demultiplex unit 148 is used to concert a signal of each branch into a data stream using a channel matrix estimated by the channel estimation unit 146. An example of processing performed by the spatial demultiplex unit 148 will be shown. The spatial demultiplex unit 148 calculates an antenna reception weighting matrix W using a channel matrix H. Then, the spatial demultiplex unit 148 performs spatial decoding of a spatially multiplexed signal by carrying out a matrix multiplication of a reception vector having each received stream as an element and the antenna reception weighting matrix W to obtain an independent signal sequence for each stream.

The equalization unit 149 is used to bring back (equalize) a received signal degraded by a communication path and the like to an original transmission signal by further performing residual frequency offset corrections, channel tracking and the like on a signal sequence demultiplexed by the spatial demultiplex unit 148 for each stream. The received signal equalized/demodulated by the equalization unit 149 is decoded by the decoder 150 as bit sequence having likelihood.

The decoder 150 is used to perform error correcting decoding on a received signal after being passed through the equalization unit 149. By performing error correcting decoding on a received signal by the decoder 150, the received signal on which error correcting encoding has been performed can be decoded. The received signal decoded by the decoder 150 is descrambled by a subsequent descrambler (not shown) before received data is further acquired by a data acquisition unit (not shown).

In the packet format of IEEE 802.11n (See FIG. 4), for example, L-STF is detected by the synchronous circuit, the timing and frequency offset are measured in L-LTF, and the channel is estimated in HT-LTF to determine a synthesized matrix. Then, for data symbols (DATA) and thereafter, data of each branch is converted into a stream by the synthesized matrix determined by channel estimation for demodulation and decoding.

While the receiving circuit 121 starts measurement of time at a time when a notification of a transmission timing signal of a calibration sequence is received from the transmitting digital filter 138 as a starting point, a time adjusting unit 151 is used to adjust a reference time referenced by the synchronous circuit 144 when the receiving circuit 121 starts measurement of time. By making the reference time referenced by the synchronous circuit 144 adjustable by the time adjusting unit 151, an optimal portion of a calibration sequence can be cut out to perform a calibration even if a circuit delay due to the RF circuit 122 fluctuates.

In the foregoing, the configuration of the communication apparatus 100 according to an embodiment of the present invention has been described using FIG. 2. Next, an operation of the communication apparatus 100 according to an embodiment of the present invention will be described.

Figure 3:
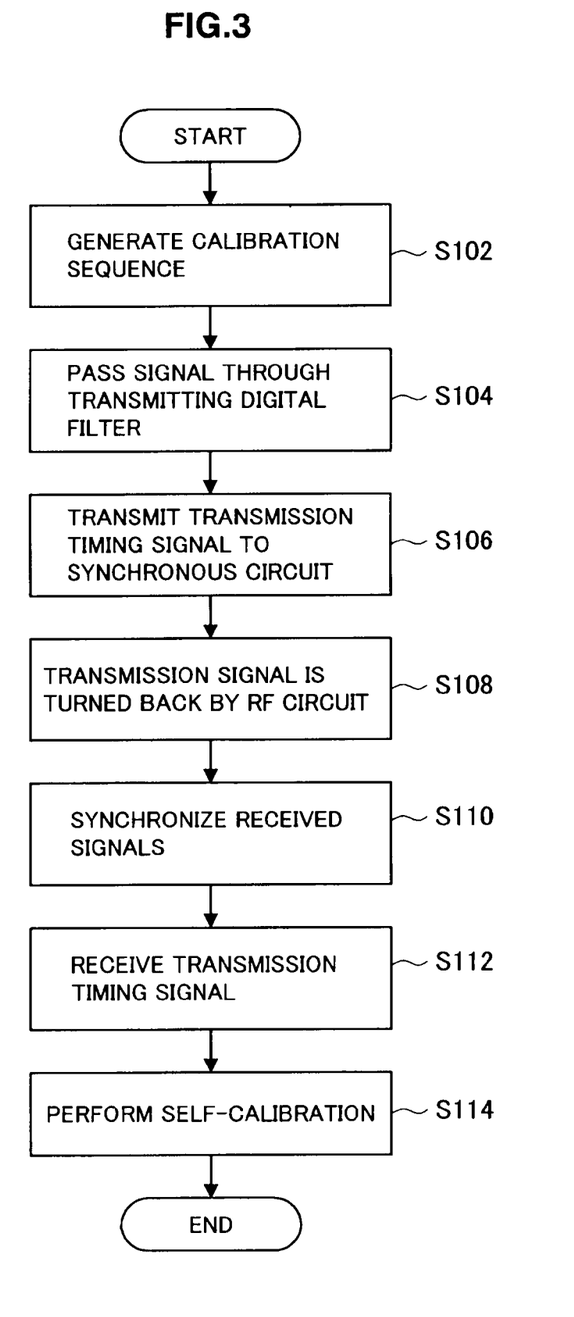
FIG. 3 is a flow chart illustrating an operation of the communication apparatus 100 according to an embodiment of the present invention.

FIG. 3 is a flow chart illustrating an operation of the communication apparatus 100 according to an embodiment of the present invention. In FIG. 3, an operation when a calibration within apparatus (self calibration) is performed in the communication apparatus 100 according to an embodiment of the present invention will be described. An operation of the communication apparatus 100 according to an embodiment of the present invention will be described below using FIG. 3.

When a self calibration is performed in the communication apparatus 100, a signal for self calibration (calibration sequence) is generated by the calibration signal generation unit 136 (step S102).

Figure 4:
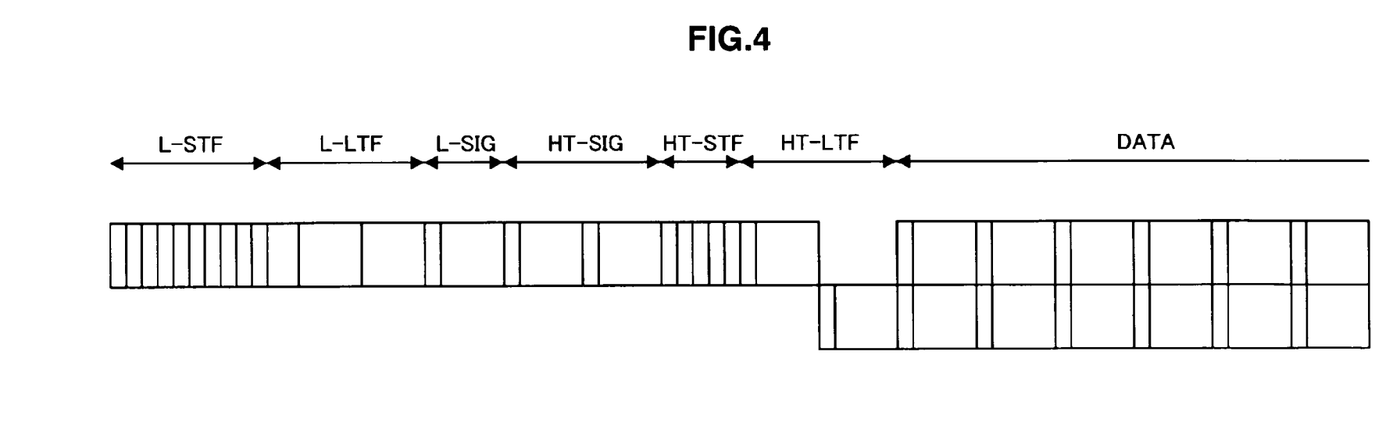
FIG. 4 is an explanatory view illustrating an ordinary IEEE 802.11n data format.
Figure 5:
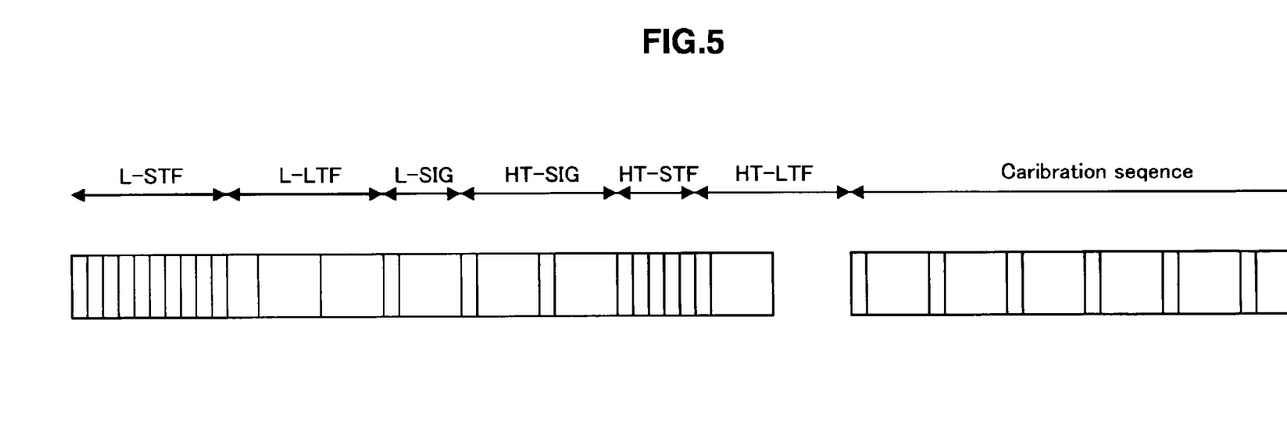
FIG. 5 is an explanatory view illustrating a calibration sequence used when a self calibration is performed in the communication apparatus 100.

FIG. 4 is an explanatory view illustrating an ordinary IEEE 802.11n data format, and FIG. 5 is an explanatory view illustrating a calibration sequence used when a self calibration is performed in the communication apparatus 100.

In an ordinary IEEE 802.11n data format, as shown in FIG. 4, transmission data is generated by adding data symbols (DATA) to the end of a preamble portion (L-STF, L-LTF, L-SIG, HT-SIG, HT-STF, and HT-LTF). L-STF (Legacy-Short Training Field) is a known signal for AGC (Automatic Gain Control) and L-LTF (Legacy-Long Training Field) is a known signal for transmission path estimation. L-SIG (Legacy Signal Field) is a control signal and HT-SIG (High-Throughput Signal Field) is a control signal conforming to a MIMO system. HT-STF (High-Throughput Short Training Field) is a known signal for AGC setting conforming to a MIMO system and HT-LTF (High-Throughput Long Training Field) is a known signal for transmission path estimation conforming to a MIMO system.

In the present embodiment, when a self calibration is performed in the communication apparatus 100, as shown in FIG. 5, only a data symbol portion is replaced with a calibration sequence generated by the calibration signal generation unit 136 while retaining a preamble portion unchanged. By replacing only a data symbol portion with a calibration sequence while retaining a preamble portion unchanged in this manner, existing circuits can be used as they are.

After a calibration sequence is generated by the calibration signal generation unit 136, the calibration sequence is added subsequent to the preamble and the signal is passed through the transmitting digital filter 138 (step S104). After the signal to which the calibration sequence is added is passed through the transmitting digital filter 138, the transmitting digital filter 138 sends a transmission timing signal of the calibration sequence to the synchronous circuit 144 (step S106).

After passing through the transmitting digital filter 138, the transmission signal is converted into an analog transmission signal by the D/A converter 139 before being turned back by the RF circuit 122 (step S108). The signal turned back by the RF circuit 122 is converted into a digital reception signal by the A/D converter 141 before being sent to the receiving digital filter 142 so that bands excluding a predetermined frequency band are cut.

A received signal after being turned back by the RF circuit 122 and passed through the receiving digital filter 142 is appropriately corrected in the received signal correction unit 143. The appropriately corrected received signal is sent to the synchronous circuit 144. The synchronous circuit 144 synchronizes received signals by detecting the preamble to decide correct timing (step S10).

The synchronous circuit 144 also receives a transmission timing signal of the calibration sequence sent from the transmitting digital filter 138 at step S106 (step S112). After receiving the transmission timing signal of the calibration sequence, the synchronous circuit 144 captures packet head timing and then determines the position where OFDM symbols are cut out by a counter based on the transmission timing signal. When determining the position where OFDM symbols are cut out, a circuit necessary for turning back a signal and a delay of a digital filter may also be taken into consideration.

In a mode (hereinafter, the mode will also be called a "normal mode") in which communication is performed with other communication apparatuses, the synchronous circuit 144 detects L-STF shown in FIG. 4 from an autocorrelation of a received signal. In a mode (hereinafter, the mode will also be called a "calibration mode") in which a calibration is performed, on the other hand, instead of determination based on packet detection, a timing signal from the transmitting circuit 120, that is, a transmission timing signal of a calibration sequence sent from the transmitting digital filter 138 is used.

By managing packet detection timing by a timer, the frequency offset in L-LTF following L-STF and the measuring section of timing can be made optimal. In normal mode, OFDM symbols are cut out by making a frequency correction of a received signal to reflect measurement results of the timing and frequency offset in L-LTF. In calibration mode, on the other hand, the timing is already referenced and thus, adjustments of the position where OFDM symbols are cut out and frequency offset corrections based on timing measurement results in L-LTF may not be made so that these adjustments and corrections can be made when necessary.

By managing packet detection timing by a timer, the fixed position of a calibration sequence can each time be cut out in calibration mode as OFDM symbols like the normal mode. Then, a Fourier transform of the cut calibration sequence is performed by the fast Fourier transform unit (FFT unit) 145. By performing a Fourier transform of the cut calibration sequence, it becomes possible for the calibration measuring unit 147 to make calibration measurements. Then, the calibration measuring unit 147 performs a self calibration using a Fourier-transformed calibration sequence (step S114). The method of self calibration using a calibration sequence can be an existing method and is not limited to a specific method and thus, a detailed description thereof is omitted.

In the foregoing, the operation when a calibration within apparatus (self calibration) is performed in the communication apparatus 100 according to an embodiment of the present invention has been described using FIG. 3. If the desired cutout position of OFDM symbols is shifted due to a change in delay caused by a circuit change or the like, the cutout position of symbols may be adjusted by changing the value referenced by the timer in the synchronous circuit 144.

In the present embodiment, as described above, when a self calibration is performed by RF circuit loop-back that turns back a signal by transmission and reception circuits of the same branch, characteristics of the transmission circuit and those of the reception circuit are made to be compared by making the cutout timing of a calibration signal the same each time. Accordingly, loop-back characteristics of reception/transmission of each branch can be adjusted for self calibration, so that a calibration can be performed reciprocally. Moreover, a steering vector can be generated based on channel characteristics estimated on the receiving side, so that the steering vector is reflected on the transmitting side.

Further, in the present embodiment, transmission timing information of a calibration signal is referenced by a synchronous circuit on the receiving side and thus, a self calibration can be performed by using an existing circuit without increasing the circuit size. By using a function, included in an existing communication apparatus, to cut out received data in units of OFDM symbols, calibration measurements made in the frequency region can be supported and also a scan in which the correction coefficient is changed for each OFDM can be supported.

Further, in the present embodiment, both a self calibration by RF circuit loop-back that turns back a signal by transmission and reception circuits of the same branch and that by antenna loop-back that turns back a transmitted signal by a receiver of another branch can be supported.

Further, in the present embodiment, time measurements can be made on the receiving side with reference to transmission start timing on the transmitting side, and a reference time when time measurements are made on the receiving side can be input from outside (for example, the time adjusting unit 151). Thus, by inputting the reference time when time measurements are made on the receiving side from outside, a calibration can be performed by cutting out an optimal portion of a calibration signal even if a circuit delay fluctuates accompanying an environment change.

The above calibration processing may be performed by a computer program stored in a ROM, EEPROM, or other storage unit provided inside the communication apparatus 100 being successively read by a CPU or other control devices provided inside the communication apparatus 100.

The present application contains subject matter related to that disclosed in Japanese Priority Patent Application JP 2008-180247 filed in the Japan Patent Office on Jul. 1, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For example, the calibration signal generation unit 136 may change the calibration signal for each OFDM symbol. By changing the calibration signal for each OFDM symbol, the correction value can be decided by determining which correction value corrects an influence of a circuit most correctly.

While the calibration signal generation unit 136 generates a signal for calibration (calibration sequence) in the above embodiment, the present invention is not limited to such an example. For example, the calibration signal generation unit 136 may hold a calibration sequence in advance so that the calibration sequence held by the calibration signal generation unit 136 is sent out during calibration.

FIG. 2B illustrates as if the time adjusting unit 151 are provided inside the receiving circuit 121, but it is needless to say that the present invention is not limited to such an example, and the time adjusting unit 151 may be provided outside the receiving circuit 121.

What is claimed is:

1. A communication apparatus, comprising:
a transmission unit that transmits information signals; and
a reception unit that receives information signals, wherein
the transmission unit includes
a calibration signal generation unit that generates a calibration signal for transmission to the reception unit, the calibration signal including data for synchronizing the transmission and reception unit; and
a notification generation unit that generates a notification signal when the calibration signal has been generated the notification signal including information indicating a timing of generating the calibration signal, and transmits the notification signal to the reception unit, and the reception unit includes
a calibration signal detection unit that synchronizes the transmission unit and the reception unit at the reception unit with the data in the calibration signal, starts a timer when the notification signal is received, and detects the calibration signal transmitted from the transmission unit after the timer indicates that a predetermined reference time has elapsed.

2. The communication apparatus according to claim 1, wherein
the reception unit further includes
a synchronization unit that extracts calibration information from the signals received by the reception unit at a frequency corresponding to the reference time and synchronizes the signals received by the reception unit, and the calibration signal detection unit detects the calibration signal as internal feedback from the transmission unit to the reception unit.

3. The communication apparatus according to claim 1, wherein
the calibration information detection unit extracts received information in units of OFDM (Orthogonal Frequency Division Multiplexing) symbols after the reference time elapses.

4. The communication apparatus according to claim 3, wherein
the calibration signal generation unit changes the calibration signal for each OFDM symbol.

5. The communication apparatus according to claim 1, further comprising an antenna element that transmits and receives information signals, wherein
the calibration signal is transmitted from one antenna element to another antenna element and the calibration signal detection unit detects the calibration signal received by the other antenna element.

6. The communication apparatus according to claim 1, further comprising a calibration reference time adjusting unit that adjusts the reference time based on an input indicating a new reference time.

7. A communication calibration method, comprising:
transmitting information signals with a transmitter; and
receiving information signals with a receiver, wherein the transmitting includes
generating a calibration signal, the calibration signal including data for synchronizing the transmitter and the receiver,
generating a notification signal when the calibration signal has been generated the notification signal including information indicating a timing of generating the calibration signal, and
transmitting the notification signal to the receiver; and
the receiving includes
synchronizing the transmitter and the receiver at the receiver with the data in the calibration signal,
starting a timer when the notification signal is received,
detecting the calibration signal from the transmitter after the timer indicates that a predetermined reference time elapses.

8. The communication apparatus according to claim 2, wherein
the calibration information detection unit extracts received information in units of OFDM (Orthogonal Frequency Division Multiplexing) symbols after the reference time elapses; and
the synchronization unit determines where OFDM symbols are extracted based on information included in the notification signal.

9. A communication apparatus, comprising:
a transmission unit that transmits information signals; and
a reception unit that receives information signals, wherein
the transmission unit includes
a calibration signal generation means for generating a calibration signal for transmission to the reception unit, the calibration signal including data for synchronizing the transmission and reception unit; and
a notification generation unit means for generating a notification signal when the calibration signal has been generated the notification signal including information indicating a timing of generating the calibration signal, and transmits the notification signal to the reception unit, and the reception unit includes
a calibration signal detection means for synchronizing the transmission unit and the reception unit at the reception unit with the data in the calibration signal, starting a timer when the notification signal is received, and detecting the calibration signal transmitted from the transmission device after the timer indicates that a predetermined reference time has elapsed.

* * * * *